Jan. 29, 1963   F. H. FLAM   3,075,783
COLLAPSIBLE STROLLER FRAME LINKAGE
Filed April 3, 1961   2 Sheets-Sheet 1

INVENTOR.
FREDERICK H. FLAM
BY Flam and Flam
ATTORNEYS.

Jan. 29, 1963  F. H. FLAM  3,075,783
COLLAPSIBLE STROLLER FRAME LINKAGE
Filed April 3, 1961  2 Sheets-Sheet 2
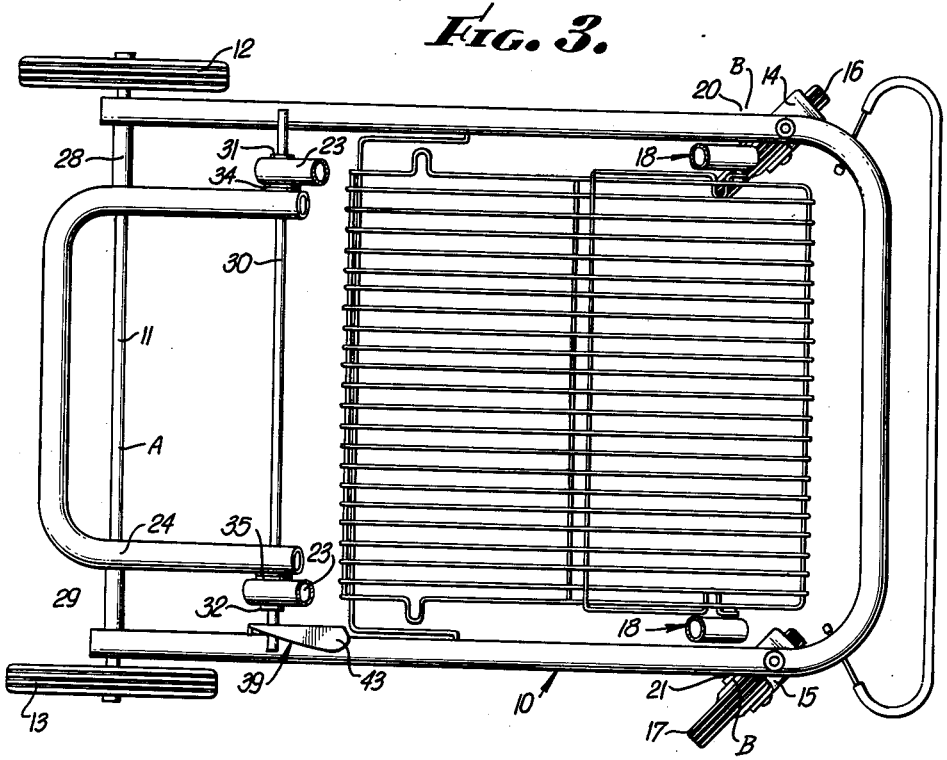
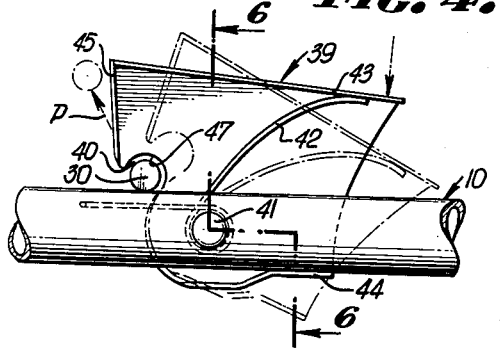
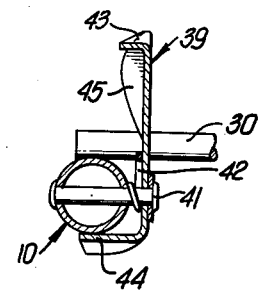
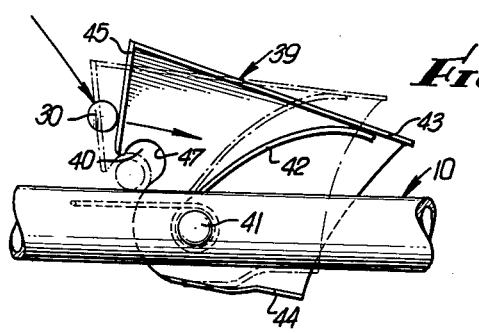
INVENTOR.
FREDERICK H. FLAM
BY
Flam and Flam
ATTORNEYS.

United States Patent Office 3,075,783
Patented Jan. 29, 1963

3,075,783
COLLAPSIBLE STROLLER FRAME LINKAGE
Frederick H. Flam, Tarzana, Calif., assignor, by mesne assignments, to Aeon Industries Inc., doing business as Pride Products Co., Glendale, Calif., a corporation of California
Filed Apr. 3, 1961, Ser. No. 100,109
3 Claims. (Cl. 280—36)

This invention relates to a baby stroller and particularly to the folding mechanism therefor.

In the past, various methods have been devised for achieving a collapsible frame construction for a baby stroller. Many of them have been patterned upon prior baby carriage structures. One type of collapsible frame structure for a stroller is typified by a patent to Goodman, 2,678,219 and by a patent to Preisler et al., 2,728,-580. In these patents there is illustrated a base frame upon which four wheels are mounted. Pivotally connected to the forward end of the base frame for movement about a transverse horizontal axis is a U-shaped handle frame that extends upwardly and rearwardly. The handle frame, which may be extensible, provides a means whereby the stroller can be maneuvered. Also pivoted to the base frame, but at the rear portion thereof, and for movement about a parallel transverse horizontal axis, is a generally U-shaped arm rest frame. The arm rest frame and the handle frame cross each other, and are pivotally connected at the area of crossing. The forwardly projecting position of the arm rest frame is usually angled so as to extend horizontally. This portion forms an arm rest from which a seat may be suspended.

Obviously, since there are three elements, a base frame, a handle frame and an arm rest frame all pivotally connected to each other, a collapsing arrangement can only be provided by imparting a degree of freedom to one of the elements. In prior patents, as for example, in Heideman 2,616,718, the degree of freedom is imparted by permitting a relative sliding movement between two of the elements, together with a latch for holding the sliding parts in extended position. However, in the arrangement shown in Goodman, the degree of freedom is imparted by making one of the elements, namely the arm rest frame, of two parts. Accordingly, a mechanism analagous to a toggle is provided. In the arrangement of Goodman, a spring pressed latching shear pin is provided for securing the toggle parts against movement. A slightly different arrangement is provided in Preisler et al. In that case the toggle elements mutually engage each other to determine a limit to the extent of movement, and the parts are so proportioned that the limiting engagement occurs when the toggle elements are over center. Accordingly, the weight of the child acting upon the toggle parts tends to maintain the toggle in its extended position. However, even in the over-center arrangement of Preisler, it is possible for toggle linkage accidentally to collapse. This occurs if the child places his entire weight, or a substantial part of it, on the forwardly extending portion of the arm rest frame. In order to overcome this defect, Preisler provides a supplemental latch, carried on one of the toggle elements and engaging the other. This latch is rather difficult to operate, and it is relatively inaccessible.

The claim has been made that the toggle arrangement of Preisler et al., in which the parts mutually limit movement, produces the most sturdy arrangement. It has even been demonstrated that weight of a grown man can be supported by the mutually engaged toggle elements.

An object of this invention is to provide a more simplified structure that is even more sturdy.

Another object of this invention is to make it possible for the latch holding the toggle structure in extended position to be conveniently manipulated and the stroller collapsed by an operation no more complicated than the judicious application of toe pressure.

Still another object of this invention is to make it possible for a sturdy stroller to be easily collapsed by a woman holding a child in her arms.

In order to accomplish the foregoing objects, an axle that pivotally joins the toggle parts engages the base frame when the stroller is extended, there being no mutually engaging portions of the toggle parts to limit movement. The toggle axle furthermore serves a convenient function of providing a latch bar engaged automatically by a simple accessible pivoted latch member.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIG. 3 is a top plan view of the base frame shown in open extended position;

FIG. 4 is an enlarged fragmentary view illustrating, by the aid of full lines and phantom lines, the operation of the latch;

FIG. 5 is a view similar to FIG. 4, but illustrating how the latch is automatically effective upon extension of the stroller frame; and FIG. 6 is a sectional view, taken along the plane indicated by line 6—6 of FIG. 4.

Figure 1:
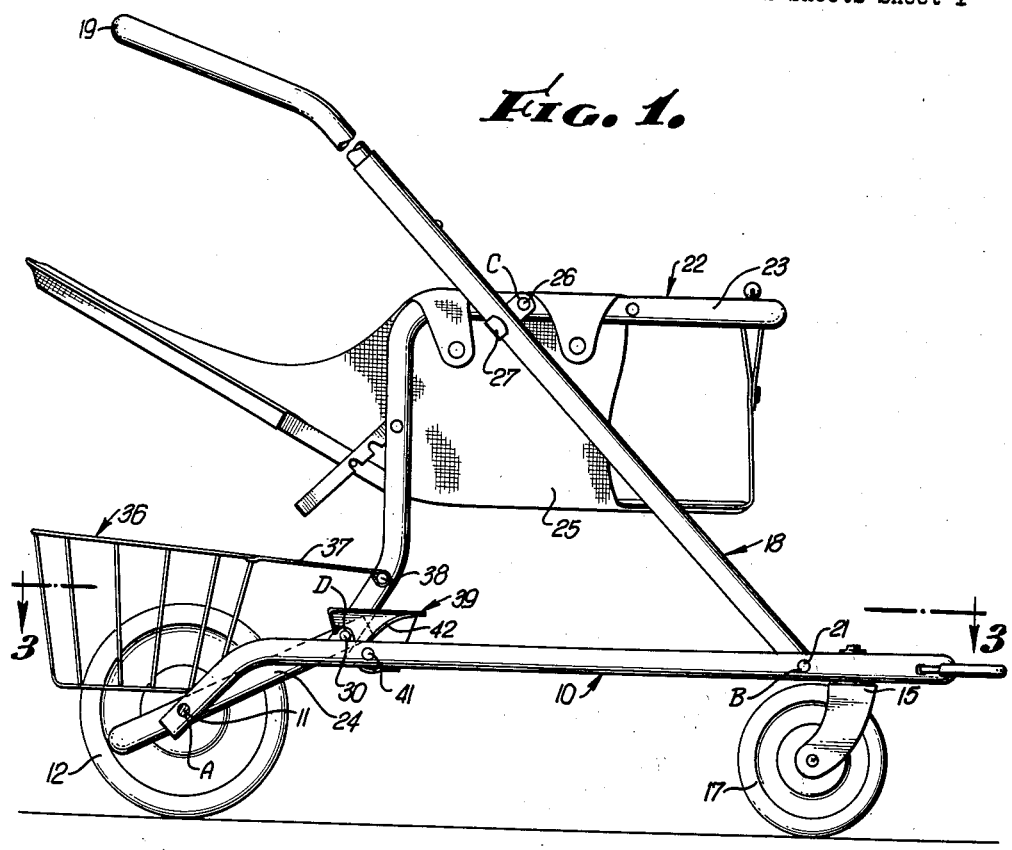
FIGURE 1 is a side elevation of a collapsible baby stroller incorporating the present invention.
Figure 2:
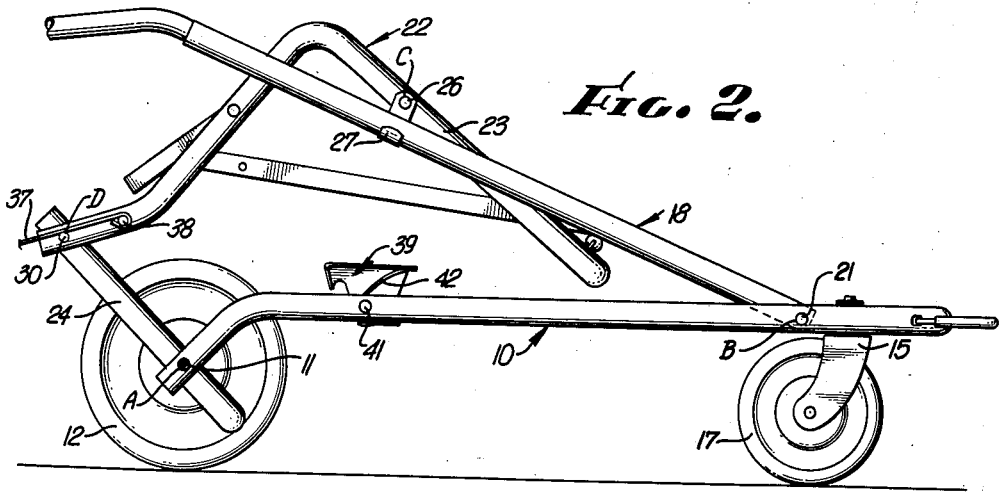
FIG. 2 is a view similar to FIG. 1, but illustrating the frame of the baby stroller in an intermediate position between the unfolded position of FIG. 1 and a folded position (not shown)

The baby stroller has a frame made of tubular metal or the like. One part of the frame is a base frame 10 that is generally U-shaped. An axle 11 extends horizontally, with ends passing transversely through the ends of the frame 10. The axle 11 mounts wheels 12 and 13 in a conventional manner. Casters 14 and 15, attached to the forward portion of the base frame arms, mount forward wheels 16 and 17. To compensate for the axes of the casters 14 and 15 being located substantially beneath the base frame 10, the ends of the base frame are downwardly bent, as indicated in FIGS. 1, 2 and 3.

Pivotally connected to the forward portion of the base frame 10, and for movement about a transverse horizontal axis, is a handle frame 18. The handle 18 is U-shaped in configuration with the central connecting portion 19 (FIG. 1) serving as a means for moving the stroller. The handle frame 18 has sides, the ends of which extend on the inside of the base frame. A pivotal attachment is there achieved by pins 20 and 21.

An arm rest frame 22 cooperates with the base frame 10 and the handle frame 18 to complete the frame structure. The arm rest frame 22 includes two toggle parts, 23 and 24, respectively pivoted to the base frame 10 and the handle frame 18, as well as to each other. The requisite degree of freedom to the frame structure is accordingly provided.

The toggle part 23 is generally of U-shaped configuration in plan, and angled in elevation to provide a horizontal and a vertical portion. The forward horizontal portions of the sides provide arm rests. From the horizontal portion of the toggle part 23, a fabric or other suitable seat structure 25 is suspended in a conventional manner.

The toggle part 23 is centrally pivoted to the handle frame 18 at a place above the base frame 10 and by the aid of rivets 26 at each side. The rivets 26 engage the projecting portions of hook-like clips 27 welded to the sides of the handle frame 18.

The toggle part 24 is also generally of U-shape, as illustrated in FIG. 3. The toggle part 24 is pivoted to the base frame 10 by having the axle 11 pass through aligned apertures in the sides of the toggle part 24. The connecting portion of the part 24 and the ends of its sides are spaced from the axle 11. Spacers 28 and 29 accommodated on the axle 18 serve to center the toggle part 24.

The ends of the toggle part 24 fit between the ends of the toggle part 23 where they are pivotally connected together. For this purpose, and as shown most clearly in FIG. 3, a bar 30 is provided. The bar 30 passes through aligned apertures in the ends of the toggle parts 23 and 24. The bar 30 projects laterally so that its ends lie in juxtaposed relationship to the sides of the base frame 10.

The frame structure, essentially, is a quadrilateral (FIGS. 1 and 2) with all of the sides connected at axes A, B, C and D corresponding to axle 11, pins 20, 21, rivets 26 and bar 30. In the position illustrated in FIG. 1, the toggle part 24 has been rotated about the axes A so that the sides of the toggle part 24 extend generally forwardly of the stroller. In this position, the latch bar 30 engages the base frame 10 and limits the forward rotation of the toggle part 24. The toggle part 23 and the handle frame 18 assume definite positions related to that of the toggle part 24.

As the toggle part 24 is rotated in a counterclockwise direction from the position of FIG. 1, and in FIG. 2, the toggle part 23 and the handle frame 18 follow, and the frame structure moves to a collapsed position. During the course of this movement, the handle frame 18 moves downwardly and rearwardly and toward a coincident relationship with the base frame 10. The toggle part 23 undergoes a compound movement, but it is accommodated compactly between the other generally aligned handle frame parts.

The bar 30 is centered by spring lock washers 31 and 32 located just beyond the sides of the toggle part 23. Spacer washers 34 and 35 are accommodated between the ends of the sides of the toggle parts 23 and 24.

A wire basket 36 has two parallel arms 37 extending forwardly from the opposite sides of the basket top. These arms 37 are journalled upon pins 38 projecting laterally inwardly of the toggle part 23. The bottom of the basket 36 rests upon, but is not attached to, the toggle part 24. This arrangement facilitates the collapsing movement of the frame. Thus, the basket 36 is merely cranked rearwardly as the frame members move to a collapsed position, the arms 37 offsetting the basket behind the base frame 10. The basket and related structure are shown and described in a copending application of Julius Feldhorn, Serial No. 102,169, filed April 11, 1961, now forfeited, and who is acknowledged to be the inventor of this subject matter.

The sides of the toggle parts 23 and 24 fall close to the sides of the base frame 10 when the frame structure is extended. Accordingly, the relatively short projecting portions of the bar 30 serve effectively to transmit forces to the base frame. The ends of the bar 30 are placed in shear, and obviously provide a most sturdy arrangement.

When most of the weight of the child in the stroller is behind the rivets 26, the toggle part 23 tends to rotate in a direction corresponding to engagement between the bar 30 and the base frame. Stability is ensured since the bar passes downwardly beyond a line joining the axes A and C. This means that in order to collapse the stroller with a child in the stroller, the arm rest part 23 must be lifted against the force of the child's weight. But if the child moves forwardly, there is a danger.

To prevent accidental collapsing movement of the frame as by imposition of weight at the forward portion of the toggle part 23, a latch structure is provided.

The latch comprises a plate 39 that is oriented in a vertical plane at the side of the base frame 10. The latch plate extends above and partially below the base frame 10. It normally occupies a position, shown in full lines in FIG. 4, that confines the bar 30 against the base frame 10. For this purpose the latch plate 39 has a semicircular recess 40 in its rear edge that partially circumscribes the bar 30 when it contacts the base frame 10. The latch plate 39 is immediately engaged upon attempted movement of the bar 30 in its path, depicted by arrow P, away from the base frame 10.

The bar 30, however, can be released. For this purpose, the latch plate is mounted for angular movement by a pin 41 carried by the base frame. The axis of the pin 41 lies forwardly of the bar 30; thus upon clockwise movement as viewed in FIG. 4, the latch plate 39 clears the path P and the stroller can be collapsed.

A coil spring 42 normally maintains the latch 39 in latching position. One end of the coil spring 42 engages a flange 43 at the top of the latch member 39, and the other end is bent to engage an aperture in the base frame 10.

The latch has a lower flange 44 that engages the undersurface of the base frame 10 to stop the latch in the full line position of FIG. 4. The top flange 43 conveniently may be pedally or normally engaged to move the latch to releasing phantom line position. The flanges 43 and 44 also strengthen the latch plate 39.

The latch plate 39 operates automatically when the bar 30 is moved toward the base frame 10. For this purpose the rear edge of the plate 39 above and adjoining the recess 40 acts as a cam surface. A flange 45 in effect broadens the area of the cam surface.

The path P of the bar 30 intersects the flange 45 which has a very slight angularity with respect to the path P. As the bar 30 strikes the flange 45, the force exerted upon the latch 39 has a normal component that provides a turning torque, and the latch retracts as indicated in full lines in FIG. 5. When the latching bar 30 proceeds sufficiently, the recess 40 is entered, and the latching plate 39 returns to the position illustrated in phantom lines in FIG. 5.

Should the bar 30 tend to rotate away from the base frame 10, the reaction on the latching surface 47 will be so directed as to pass close to the axis of the pin 41, and the force, acting as a very slight lever arm will be inadequate to overpower the spring 42.

When the latch is released, a simple upward pull on the bar 30, or a push on the connecting portion of either toggle part 23 or 24 will cause the stroller frame to collapse. Standing in front of the stroller the left toe may release the latch while the connecting portion of the toggle part 24 is pushed. The operation is so simple that it can be performed even while holding a child.

The inventor claims:

1. A collapsible baby stroller frame comprising: a base frame; a handle frame pivoted to the base frame for movement about a first axis; an arm rest frame including a pair of toggle parts respectively pivotally connected to the base frame and the handle frame for angular movement about second and third axes parallel to said first axis; and axle means pivotally connecting the toggle parts together for relative movement about a fourth axis parallel to said first axis; said axle means having parts engaging the base frame to determine the limit of movement of said toggle parts in a frame opening direction.

2. The combination as set forth in claim 1 together with automatic cam latch means mounted on the base frame and engaging the axle means to hold the stroller frame in extended position.

3. A collapsible baby stroller frame comprising: a base frame; a handle frame pivoted to the base frame for movement about a first axis; an arm rest frame including a pair of toggle parts respectively pivotally connected to the base frame and the handle frame for angular movement about second and third axes parallel to said first axis; axle means pivotally connecting the toggle parts together for relative movement about a fourth axis parallel to said first axis; said axle means having parts engaging the base frame to determine the limit of movement of said toggle parts in a frame opening direction; a latching plate pivotally connected to said base frame forwardly of the place of engagement of said axle means with said base frame, and having a latching recess confining the axle means at said base frame; said latching plate being swingable to a retracted position to clear the path of movement of said axle means; and spring means urging the latching plate to latching position; said latching plate having cam means adjoining the latching recess and in the path of said axle means for retraction of said latching plate upon engagement with said axle means; the latching recess being so located that the reaction thereon due to retracting movement of said axle means produces a torque of short lever arm on said latching plate.

References Cited in the file of this patent
UNITED STATES PATENTS
2,728,580    Preisler et al. _____ Dec. 7, 1955
FOREIGN PATENTS
622,622    Great Britain _____ May 4, 1949